United States Patent
Koyanagi et al.

(10) Patent No.: US 6,294,230 B1
(45) Date of Patent: Sep. 25, 2001

(54) SPHERICAL LAMINATED PARTICLE AND LIQUID CRYSTAL DISPLAY

(75) Inventors: Tsuguo Koyanagi; Kazuhiro Nakayama; Yutaka Mitsuo; Mitsuru Nakai; Michio Komatsu, all of Kitakyushu (JP)

(73) Assignee: Catalysts & Chemicals Industries Co., Ltd. (JP)

( * ) Notice: Subject to any disclaimer, the term of this patent is extended or adjusted under 35 U.S.C. 154(b) by 0 days.

(21) Appl. No.: 09/380,326
(22) PCT Filed: Feb. 20, 1998
(86) PCT No.: PCT/JP98/00707
§ 371 Date: Aug. 27, 1997
§ 102(e) Date: Aug. 27, 1999
(87) PCT Pub. No.: WO98/38037
PCT Pub. Date: Sep. 3, 1998

(30) Foreign Application Priority Data

Feb. 28, 1997 (JP) .................................... 9-046653

(51) Int. Cl.$^7$ .............................. B23B 7/02; G02F 1/1339
(52) U.S. Cl. .......................... 428/1.52; 428/405; 349/155
(58) Field of Search .................................. 428/1.5, 1.52, 428/405, 407; 349/155

(56) References Cited

U.S. PATENT DOCUMENTS 5,231,527  7/1993  Takanashi et al. ...................... 359/81

FOREIGN PATENT DOCUMENTS

| | | |
|---|---|---|
| 2-022625 | 1/1990 | (JP) . |
| 4-313727 | 11/1992 | (JP) . |
| 5-080343 | 4/1993 | (JP) . |
| 6-010928 | 2/1994 | (JP) . |
| 06160866 | * 6/1994 | (JP) . |
| 6-160866 | 6/1994 | (JP) . |
| 06250193 | * 9/1994 | (JP) . |
| 6-250193 | 9/1994 | (JP) . |
| 7-080343 | 3/1995 | (JP) . |
| 7-095165 | 10/1995 | (JP) . |
| WO9206402 | 4/1992 | (WO) . |

* cited by examiner

Primary Examiner—Alexander S. Thomas
(74) Attorney, Agent, or Firm—Webb Ziesenheim Logsdon Orkin & Hanson, P.C.

(57) ABSTRACT

The present invention relates to spherical laminated particles each comprising a core particle and a laminate part disposed on a surface of the core particle, wherein the laminate part has a compressive modulus which is smaller than that of the core particle. These spherical laminated particles have a large compressive strength and is excellent in the recovery from a deformation by an arbitrary load, when the load is removed afterwward, as compared with conventional elastic particles composed of a single substance. Therefore, the use of these spherical laminated particles as spacers minimizes the difference in extent of displacement of spacer particles attributed to the difference in load on individual spacer particles caused by, for example, the waviness of a substrate for liquid crystal display cell during the manufacturing of the liquid crystal display cell, so that the cell gap uniformity can be ensured.

4 Claims, 1 Drawing Sheet

SPHERICAL LAMINATED PARTICLE AND LIQUID CRYSTAL DISPLAY

TECHNICAL FIELD

The present invention relates to spherical laminated particles having a specified compressive modulus and a liquid crystal display having the spherical laminated particles interposed as spacers between liquid crystal cell electrodes thereof.

BACKGROUND ART

Spacers are interposed between a pair of electrodes disposed in a liquid crystal cell of liquid crystal display and a liquid crystal substance is sealed in a space surrounded with the electrodes and spacers to thereby form a liquid crystal layer. When the thickness of this liquid crystal layer is not uniform, the image displayed on the liquid crystal cell becomes mottled and causes lighting-time contrast degradation. Therefore, the uniformity of the thickness of liquid layer inside the liquid crystal cell is desirable. Further, the uniformity of the thickness of the liquid crystal layer inside the liquid crystal cell is also required, when the displayed image is changed over at a high speed or when an image of large viewing angle is displayed.

Still further, for realizing a large-scope display free from mottles on the currently employed large-scope liquid crystal display device of STN mode, it is required in greater degree to uniformalize the thickness of the liquid crystal layer inside the liquid crystal cell.

It is common practice to interpose, in sparsely dispersed form, spherical particles of uniform size between electrodes of the liquid crystal cell, namely to employ spherical particles as interelectrode spacers of the liquid crystal cell, for uniformalizing the thickness of the liquid crystal layer inside the liquid crystal cell. Particles of an organic resin such as polystyrene and fine particles of silica are used as such spherical particles.

However, the use of organic resin particles such as polystyrene particles as the interelectrode spacers of the liquid crystal cell invites the problem that the organic resin particles are too soft to maintain the uniformity of the thickness of the liquid crystal layer inside the liquid crystal cell. For example, if nonuniform pressure is applied to the liquid crystal layer inside the liquid crystal cell, the spacers are deformed in accordance with the nonuniformity of the pressure to thereby disenable maintaining the uniformity of the thickness of the liquid crystal layer inside the liquid crystal cell.

On the other hand, when fine particles of silica are used as the interelectrode spacers of the liquid crystal cell, unsharpness of particle-size distribution of silica fine particles invites the problem that the thickness of the liquid crystal layer inside the liquid crystal cell is rendered nonuniform because of the smallness of the compressive deformation of the silica fine particles. Furthermore, when the liquid crystal display is exposed to low temperatures with void formation, namely low-temperature bubbling, another problem occurs between the liquid crystal layer and the electrode of the liquid crystal cell, because the thermal expansion coefficient of the liquid crystal layer is different from that of the spacers.

Consequently, for solving the above problems, various proposals have been made which comprise using fine particles having appropriate elasticity and mechanical recovery as the spacers.

For example, it has been proposed to employ fine particles composed mainly of an organic resin such as a vinyl plastic or a hybrid of inorganic material and organic material (see Japanese Patent Laid-open Publication No. 4(1992)-313727 and Japanese Patent Laid-open Publication No. 5(1993)-80343) and to employ fine particles of a hydrolyzate of an organosilicon compound such as tetraethoxysilane (see Japanese Patent Laid-open Publication No. 6(1994)-250193 and Japanese Patent Laid-open Publication No. 7(1995)-80343).

However, these fine particles are unsatisfactory as the interelectrode spacers of the liquid crystal cell because, when nonuniform load is applied to the liquid crystal layer, the particles are deformed in accordance with the nonuniformity of the load to thereby disenable maintaining the uniformity of the thickness of the liquid crystal layer.

OBJECT OF THE INVENTION

The present invention has been made with a view toward solving the problems encountered when the above conventional elastic particles are used as the spacers. It is the object of the present invention to provide spherical laminated particles each comprising a core particle having a specified compressive modulus and a laminate part disposed on a surface of the core particle, the laminate part having a compressive modulus which is smaller than that of the core particle, and to provide a liquid crystal display having the spherical laminated particles interposed as spacers.

SUMMARY OF THE INVENTION

The spherical laminated particles of the present invention are those each comprising a core particle and a laminate part disposed on a surface of the core particle, wherein the laminate part has a compressive modulus which is smaller than that of the core particle.

With respect to these spherical laminated particles, it is preferred that the compressive modulus of the core particle be in the range of 200 to 6000 kg/mm$^2$, and the compressive modulus of the spherical laminated particles be in the range of 50 to 1000 kg/mm$^2$.

Further, with respect to these spherical laminated particles, it is preferred that the compressive modulus of the core particle be in the range of 200 to 6000 kg/mm$^2$, and the compressive modulus of the laminate part be in the range of 50 to 1000 kg/mm$^2$.

This core particle is preferably composed of a polysiloxane obtained by hydrolyzing an organosilicon compound represented by the following formula (I) and/or formula (II):

$$Si(OR^1)_4 \qquad (I)$$

$$R^2Si(OR^3)_3 \qquad (II)$$

wherein each of $R^1$ and $R^3$ represents a hydrogen atom or an organic group having 1 to 10 carbon atoms selected from among alkyl, alkoxyalkyl and acyl groups; and $R^2$ represents a group having 1 to 10 carbon atoms selected from among substituted or unsubstituted hydrocarbon groups.

It is especially preferred that the core particle be composed of a polysiloxane obtained by subjecting a mixture of an organosilicon compound represented by the above formula (I) and/or formula (II) and a silicic acid solution to hydrolysis and polymerization.

The laminate part is preferably composed of a hydrolyzate of one member or a mixture of at least two members selected from among compounds represented by the following fomulae (II) to (IV): r-

$$R^2Si(OR^3)_3 \quad \text{(II)}$$

$$R^4R^5Si(OR^6)_2 \quad \text{(III)}$$

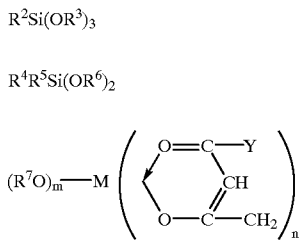  (IV)

wherein each of $R^2$ and $R^3$ is as defined above; each of $R^4$ and $R^5$ represents a group having 1 to 10 carbon atoms selected from among substituted or unsubstituted hydrocarbon groups; $R^6$ represents a hydrogen atom or an organic group having 1 to 10 carbon atoms selected from among alkyl, alkoxyalkyl and acyl groups; $R^7$ represents a propyl group or a butyl group; Y represents an organic group selected from among methyl, methoxy and ethoxy groups; M represents an element selected from among those of the Groups 2 to 15 of the periodic table; and m is an integer of 0 to 3 and n an integer of 1 to 4 provided that m+n is an integer of 2 to 4.

The liquid crystal display of the present invention comprises a liquid crystal cell fitted with a pair of electrodes between which the above spherical laminated particles of the present invention are interposed as spacers.

DETAILED DESCRIPTION OF THE INVENTION

Spherical Laminated Particles

Figure 1:
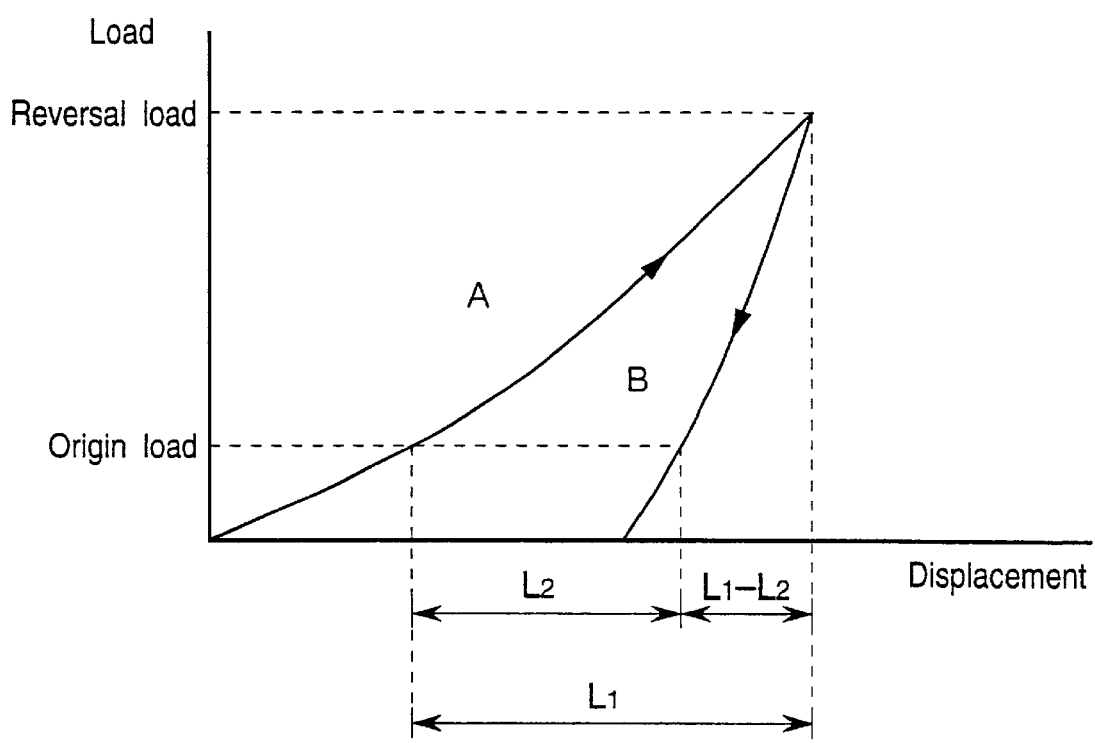
FIG. 1 is a graph of load versus displacement for explaining elastic recovery ratio and compressive deformation ratio.

The spherical laminated particles of the present invention are those each comprising a core particle and a laminate part disposed on a surface of the core particle, the laminate part composed of a material having a composition different from that of the core particle. This laminate part characteristically has a compressive modulus which is smaller than that of the core particle. That is, the spherical laminated particles of the present invention are those having a double layer structure which comprises a core particle having a relatively large compressive modulus and a laminate part whose compressive modulus is smaller than that of the core particle.

With respect to the spherical laminated particles of the present invention, it is preferred that the compressive modulus of the core particle be in the range of 200 to 6000 kg/mm$^2$, especially 500 to 6000 kg/mm$^2$, and that the compressive modulus of the spherical laminated particles per se be in the range of 50 to 1000 kg/mm$^2$, especially 100 to 1000 kg/mm$^2$. Further, the compressive modulus of the laminate part is preferably in the range of 50 to 1000 kg/mm$^2$, more preferably 100 to 1000 kg/mm$^2$.

The use of the spherical laminated particles comprising the core particle and the laminate part having compressive moduli falling within the above ranges, or the spherical laminated particles having compressive modulus falling within the above range, result in the excellent recovery when, after deformation by an arbitrary load, the load is removed to thereby enable enhancing the uniformity of the cell gap.

The terminology "compressive modulus" used herein means the average value of the compressive moduli of five particles, the compressive modulus of each particle determined by applying a load to the particle in the direction toward particle center at a constant loading speed by means of a micro-compression-tester to thereby deform the particle until the compression displacement becomes 10% of the particle diameter, measuring the compression load and compression displacement and calculating the compressive modulus of the particle according to the following formula:

$$E = \frac{3}{2^{1/2}} \times \frac{F \times (1-K^2)}{S^{3/2} \times R^{1/2}}$$

wherein

E: compressive modulus (kg/mm$^2$),

R: particle diameter (mm),

F: compression load (kg),

K: Poisson's ratio (constant: 0.38), and

S: compression deformation (mm).

The compressive modulus of the laminate part can be determined by forming the laminate part constituting component into particles and measuring the compressive modulus of the particles by the above method.

Core Particle

The core particle is not particularly limited as long as it is composed of a material having a relatively large compressive modulus. For example, use can be made of particles of an organic resin or an inorganic compound such as silica conventionally employed as spacers. Further, black particles obtained by coloring the above particles by an appropriate method can also be used as the core particles in the present invention. These core particles preferably have an average particle diameter of 0.1 to 10 μm, still preferably 0.5 to 8 μm.

In the present invention, the core particle is preferably composed of a polysiloxane obtained by hydrolyzing an organosilicon compound represented by the following formula (I) and/or formula (II):

wherein each of $R^1$ and $R^3$ represents a hydrogen atom or an organic group having 1 to 10 carbon atoms selected from among alkyl, alkoxyalkyl and acyl groups; and $R^2$ represents a group having 1 to 10 carbon atoms selected from among substituted or unsubstituted hydrocarbon groups.

Examples of suitable unsubstituted hydrocarbon groups include alkyl, alkenyl, aralkyl and aryl groups. The substituted hydrocarbon group is a group obtained by partly or entirely substituting hydrocarbon hydrogen atoms with nonhydrocarbon groups or nonhydrogen elements except for hydrogen. Examples thereof include chloroalkyl, γ-methacryloxypropyl, γ-glycidoxypropyl, aminopropyl, 3,4-epoxycyclohexylethyl, γ-mercaptopropyl, trifluoropropyl and fluorocarbon groups.

Examples of the organosilicon compounds represented by the formula (I) include tetramethoxysilane, tetraethoxysilane, tetraisopropoxysilane, tetrabutoxysilane and tetraacetoxysilane.

Examples of the organosilicon compounds represented by the formula (II) include methyltrimethoxysilane, methyltriethoxysilane, methyltriisopropoxysilane, methyltris(methoxyethoxy)silane, ethyltrimethoxysilane, vinyltrimethoxysilane, phenyltrimethoxysilane, γ-chloropropyltrimethoxysilane, γ-glycidoxypropyltrimethoxysilane and methyltriacetoxysilane.

The hydrolysis of these organosilicon compounds is performed by any of conventional methods, for example, by heating in a mixed solvent consisting of water and an organic solvent, to which an alkali compound such as ammonia is added as a hydrolysis catalyst, at about 10 to 20° C.

The organic solvent is not limited as long as it is miscible with water. For example, use is made of at least one member selected from among alcohols such as ethanol and butanol, glycols or glycol ethers such as ethylene glycol and ketones.

Water is preferably contained in an amount of 10 to 100 parts by weight per 100 parts by weight of the organic solvent.

The mixing ratio of organosilicon compound (I) and organosilicon compound (II) is preferably in the range of 40/60 to 99.1/0.1 (compound (I)/compound (II), mol/mol).

When this molar ratio is greater than 99.1/0.1, the compressive modulus of core particles is likely to be too high. On the other hand, when the molar ratio is smaller than 40/60, the compressive modulus of core particles is likely to be unfavorably low.

The core particles for use in the present invention are obtained by separating the thus obtained polysiloxane particles from their dispersion medium and drying the same at 40 to 200° C.

In the present invention, it is especially preferred that the core particle be composed of a polysiloxane obtained by subjecting a mixture of the above organosilicon compound (I) and/or organosilicon compound (II) and a silicic acid solution to hydrolysis and polymerization. As a result of the polymerization, there are obtained particles composed of a copolymer of organosilicon compound hydrolyzate and silicic acid. The employed reaction conditions are substantially the same as mentioned above.

The mixing ratio of the organosilicon compound and the silicic acid solution is preferably in the following range:

organosilicon compound (I)/silicic acid=60/40 to 0.1/99.1, organosilicon compound (II)/silicic acid=70/30 to 0.1/99.1, and organosilicon compounds (I)+(II)/silicic acid=70/30 to 0.1/99.1.

The silicic acid of the silicic acid solution is regarded as $Si(OH)_4$.

The terminology "silicic acid solution" used herein means an aqueous solution of silicic acid obtained by, for example, dealkalifying an aqueous solution of alkali metal/silicate.

The core particles for use in the present invention are obtained by also drying the thus obtained particles at 40 to 200° C.

Laminate Part

The material for constituting the laminate part is not particularly limited as long as the compressive modulus of the laminate part is smaller than that of the core particle.

In the present invention, as the material for constituting the laminate part, preferred use is made of at least one member selected from the compounds represented by the following formulae (II) to (IV):

$$R^2Si(OR^3)_3 \quad (II)$$

$$R^4R^5Si(OR^6)_2 \quad (III)$$

$$(R^7O)_m-M\left(\begin{array}{c}O=C-Y\\CH\\O-C-CH_2\end{array}\right)_n. \quad (IV)$$

Each of $R^2$ and $R^3$ is as defined above.

$R^4$ and $R^5$ may be identical with or different from each other and represent a group having 1 to 10 carbon atoms selected from among substituted or unsubstituted hydrocarbon groups; and $R^6$ represents a hydrogen atom or an organic group having 1 to 10 carbon atoms selected from among alkyl, alkoxyalkyl and acyl groups.

$R^7$ represents a propyl group or a butyl group; Y represents an organic group selected from among methyl, methoxy and ethoxy groups; M represents an element selected from among those of the Groups 2 to 15 of the periodic table; and m is an integer of 0 to 3 and n an integer of 1 to 4 provided that m +n is an integer of 2 to 4.

When the number of carbon atoms becomes large with respect to any of $R^2$, $R^4$ and $R^5$ of the above formulae (II) and (III), the addition of compound (II) and/or compound (III) to the core particle dispersion is likely to cause gelation and the formation of laminate part onto the surface of the core particles becomes difficult. Therefore, each of $R^2$, $R^4$ and $R^5$ preferably represents a group having a small number of carbon atoms such as methyl, vinyl, trifluoromethyl or phenylamino.

The compound represented by the formula (II) may be those employed in the above preparation of the core particles.

Examples of the compounds (organosilicon compounds) represented by the formula (III) include dimethyldimethoxysilane, dimethyldiethoxysilane, diethyldiethoxysilane, phenylmethyldimethoxysilane, γ-glycidoxypropylmethyldimethoxysilane and dimethylacetoxysilane.

Examples of the compounds represented by the above formula (IV) (acetylacetonato chelate compounds) include dibutoxybisacetylacetonatozirconium, tributoxymonoacetylacetonatozirconium, dibutoxybisacetylacetonatotitanium, triisopropoxymonoacetylacetonatotitanium, bisacetylacetonatolead, trisacetylacetonatoiron, dibutoxybisacetylacetonatohafnium and tributoxymonoacetylacetonatohafnium.

In the spherical laminated particles of the present invention, the compounds represented by the above formulae (II) to (IV) can be used either individually or in combination as the laminate part constituting component. It is especially preferred to employ a mixture containing the organosilicon compound represented by the formula (II) in an amount of about 50 mol % or more.

In the present invention, a small amount of the above organosilicon compound represented by the formula (I) may be used with the compounds represented by the formula (II) to (IV).

Method of Preparing Spherical Laminated Particles

The method of preparing the spherical laminated particles of the present invention will be described in detail below.

The spherical laminated particles of the present invention can be prepared by first dispersing the core particles in a mixed solvent consisting of water and an organic solvent, subsequently adding the compounds represented by the formulae (II) to (IV) to the dispersion and thereafter performing a hydrolysis thereof.

(i) Dispersion of Core Particles

The employed organic solvent is not limited as long as it is miscible with water. For example, use is made of at least one member selected from among alcohols such as ethanol and butanol, glycols or glycol ethers such as ethylene glycol and ketones.

Water is preferably contained in an amount of 10 to 100 parts by weight per 100 parts by weight of the organic solvent.

Further, an alkali may be added to the dispersion medium in order to stably disperse the core particles. For example, ammonia gas, aqueous ammonia, an alkali metal hydroxide such as sodium hydroxide, a quaternary ammonium salt or an amine can be used as the alkali. Still further, ultrasound may be applied to the dispersion in order to stabilize the dispersion. Still further, the stabilized dispersion may be brought into contact with a cation exchange resin to thereby remove the alkali and ammonia.

(ii) Lamination

Laminated particles are prepared by adding the compound represented by the above formulae (II) to (IV) to the thus obtained core particle dispersion and performing a hydrolysis thereof.

In this hydrolysis, an alkali compound such as ammonia is generally used as a hydrolysis catalyst.

In the addition of the compound represented by the above formulae (II) to (IV) to the core particle dispersion, too rapid addition may lead to the occurrence of particle aggregation in the core particle dispersion or the nonuniform lamination to core particle surface. As a result, the finally obtained laminated particles do not have a sharp particle size distribution. Therefore, it is preferred that the rate of addition of the above compound be regulated so as to fall within the range of 0.001 to 0.005 g/hr per 1 g of water contained in the dispersion.

Consequently, the compound represented by the above formulae (II) to (IV) is hydrolyzed in the core particle dispersion, and the resultant hydrolyzate polycondensate adheres to the surface of the core particles.

The hydrolysis temperature is preferably in the range of −10 to 20° C.

Thereafter, the dispersion may preferably be aged at a temperature ranging from 20 to 80° C. The aged laminated particles are separated from the dispersion medium by an appropriate method such as centrifugal separation and dried. Further, the laminated particles may be fired in order to promote and complete the polycondensation of the laminate.

The firing temperature is preferably in the range of 200 to 600° C. Conducting the firing in an atmosphere of, for example, an inert gas suppresses the decomposition of organic material in the particles to thereby enable enhancing the compressive strength of the particles.

Spherical laminated particles having the above specified compressive modulus can be obtained by the above process. The average particle size of these spherical particles is in the range of 1 to 20 $\mu$m, and there can be obtained spherical laminated particles having a sharp particle size distribution, which exhibit a particle size variation coefficient (CV= standard deviation/average particle size ×100) of 5% or below, preferably 3% or below.

It is preferred that the thickness of the laminate part of the obtained spherical laminated particles be in the range of 0.01 to 5 $\mu$m, especially 0.05 to 3$\mu$m.

The elastic recovery ratio (R) and compressive strength of these spherical laminated particles are in the range of 80 to 95% and 3 to 8 g, respectively. The elastic recovery ratio and the compressive strength are measured by the following methods.

Load is applied to one particle of diameter D as a sample at a constant loading rate up to a given load value (reversal load) by means of a micro-compression-tester (model MCTM-200 manufactured by Shimadzu Corporation) to thereby deform the particle. Referring to FIG. 1, the displacement starting from 0 is increased along curve A in accordance with the increase of the load. Thereafter, the load is removed until a given load value (load for origin) at a load removing rate which is the same as the above loading rate. The displacement is slowly reduced along curve B in accordance with the removal of the load. Provided that $L_1$ is the difference between the displacement at origin load in the loading stage and the displacement at reversal load and that $L_2$ is the difference between the displacement at origin load in the loading stage and the displacement at origin load in the load removing stage, the elastic recovery ratio of the sample is calculated by the formula:

$$R=[(L_1-L_2)/L_1]\times 100.$$

In the present invention, with respect to ten particles, the respective elastic recovery ratios of the particles are determined according to the above formula under the assumption that the origin load and reversal load values are 0.1 g and 1.0 g, respectively, and the average of the determined elastic recovery ratios is defined as the "elastic recovery ratio" used herein. The compressive strength is the load which is exhibited when the load is applied over the above reversal load and the particle is ruptured.

Liquid Crystal Display

The liquid crystal display of the present invention will now be described.

The liquid crystal display of the present invention comprises a liquid crystal cell fitted with a pair of electrode substrates between which the above spherical laminated particles of the present invention are interposed as spacers.

Although the structure of this liquid crystal cell is the same as that of the common liquid crystal cell, the interelectrode-substrate distance (cell gap) of the liquid crystal cell is held uniform by virtue of the spherical laminated particles of the present invention. These spherical laminated particles are interposed between the electrode substrates and further, not limited thereto, may be disposed in a sealing adhesive layer arranged between the electrode substrates at peripheral parts thereof.

The spherical laminated particles for use as spacers of a liquid crystal display according to the present invention are those having a double layer structure which comprises a core particle and the laminate part formed by a substance whose compressive modulus is smaller than that of the core particle disposed on the surface of core. Accordingly, the spherical laminated particles are superior to the conventional elastic fine particles in the capability of finely regulating the cell gap uniformity.

For improving the cell gap uniformity, it is preferred that the dispersion of size of employed particles be as small as possible. The CV value as an index thereof is preferably 5% or below, still preferably 3% or below, in the present invention.

Generally, glass plates used as electrode substrates in the liquid crystal cell have minute waviness and strain. When these plates are bonded through spacers with each other under pressure, minute differences may occur between the loads applied to individual spacers because of, for example, the waviness of the plates. Therefore, elastic fine particles are used as spacers so that the compression displacements of individual spacers are varied in conformity with the minute load differences to thereby maintain the cell gap uniformity.

If single-elasticity fine particles are used as the above spacers, the whole particle body is deformed in conformity with the above minute load differences with the result that it is difficult to finely regulate the cell gap uniformity of the liquid crystal cell.

In contrast, even though the individual spacers deform in conformity with the above minute load differences in the spherical laminated particles of the present invention used as spacers, the displacement is only that of the laminate part. In consequence, the particle displacement differences are smaller than in the case of uniform-elasticity particles. Consequently, the cell gap uniformity of obtained liquid crystal cell can be finely regulated.

Moreover, the liquid crystal display of the present invention is as excellent as that in which the conventional elastic particles are employed in the prevention of low-temperature bubbling.

The liquid crystal display of the present invention is produced by the same process as employed in the production of the common liquid crystal display. For example, the above spherical laminated particles are uniformly spread on a surface of one electrode substrate, and the periphery of the other electrode substrate except a liquid crystal injection port is coated with a sealing resin. The two electrode substrates are attached to each other and, under an appropriate pressure, the sealing resin is cured by heating or other means. A liquid crystal is injected therebetween, and the injection port is sealed. A liquid crystal display is produced from the thus obtained liquid crystal display cell.

The spherical laminated particles, which are superior to the conventional elastic particles composed of a single substance in the recovery from a deformation by an arbitrary load, when the load is removed afterward, and which have large compressive strength, can be obtained by the present invention.

When these spherical laminated particles are used as spacers, the spacer particle displacement differences attributed to the differences of loads on individual spacer particles which are caused by, for example, the waviness of the substrates of liquid crystal display cell are decreased in the production of the liquid crystal display cell to thereby enable maintaining the cell gap uniformity.

By virtue of the use of the above spherical laminated particles as spacers, the liquid crystal display of the present invention suppresses low-temperature bubbling and is capable of producing high-quality images free from image irregularity.

EXAMPLE

The present invention will be further illustrated below with reference to the following Examples, which in no way limit the scope of the invention.

Example 1

Preparation of Core Particles 71.7 g of ammonia gas was dissolved in a mixture of 487 g of ethanol and 389 g of pure water. 17.4 g of ethyl silicate ($SiO_2$ 28% by weight) was added thereto and agitated for 2 hr. Further, 3.3 g of an aqueous solution of NaOH (1.0% by weight) was added, thereby obtaining a seed particle dispersion.

1341 g of a solution consisting of a mixture of ethanol and water (ethanol concentration: 34% by weight) and 570 g of ethyl silicate ($SiO_2$ 28% by weight) were simultaneously slowly added to 97 g of the seed particle dispersion. During the addition, the pH of the reaction mixture was maintained at 11.5 by the use of ammonia gas. After the addition of the whole amount thereof, 103 g of an aqueous solution of NaCH (1.0% by weight) was added, and the mixture was held at 70° C. for 2 hr.

The thus obtained fine particles were separated from the solvent and dried at 200° C., thereby obtaining core particles composed of a polysiloxane which had an average particle size of 2.0 μm. The compressive modulus of the core particles was measured.

The results are given in Table 1.

Preparation of Particles Composed of Laminate Part Constituting Component 100 g of aqueous ammonia (0.28% by weight) was added to a solution consisting of a mixture of 5000 g of pure water and 250 g of n-butanol. While maintaining the temperature at −5° C., 500 g of methyltrimethoxysilane was added thereto at a rate of 0.005 g/pure water·g·hr. After the completion of the addition, the temperature was raised to 60° C., and the mixture was aged for 5 hr. Thus, there was obtained a dispersion of spherical particles composed of a methyltrimethoxysilane hydrolyzate polycondensate. The obtained spherical particles were separated from the solvent, dried and fired in a nitrogen atmosphere at 400° C. Thus, there were obtained spherical particles whose average particle size and CV value were 5.3 μm and 6.8%, respectively. The compressive modulus of obtained particles (namely, corresponding to the compressive modulus of laminate part) was measured.

The results are given in Table 1.

Preparation of Spherical Laminated Particles 5 g of the above obtained core particles were dispersed in a solution consisting of a mixture of 5000 g of pure water and 250 g of n-butanol. 100 g of aqueous ammonia (0.28% by weight) was added to the dispersion. While maintaining the temperature at −5° C., 500 g of methyltrimethoxysilane was added thereto at a rate of 0.005 g/pure water·g·hr. After the completion of the addition, the temperature was raised to 60° C., and the mixture was aged for 5 hr. Thus, a polycondensate composed mainly of methyltrimethoxysilane hydrolyzate was laminated onto the core particles.

The solute of the obtained laminated particle dispersion was separated from the solvent, dried and fired in a nitrogen atmosphere at 400° C. Thus, there were obtained spherical laminated particles whose average particle size and CV value were 7.1 μm and 1.2%, respectively.

The compressive modulus, elastic recovery ratio and compressive strength of obtained spherical laminated particles were measured.

The results are given in Table 1.

Example 2

Preparation of Core Particles

A solution consisting of a mixture of 1080 g of pure water and 0.2 g of acetic acid was cooled to 5° C. A mixture of 1000 g of methyltrimethoxysilane and 180 g of ethyl silicate (SiO$_2$ 28% by weight) was added thereto and mixed. The temperature was raised to 60° C., and the mixture was agitated for 15 hr. Thus, reaction mixture (A) was obtained.

A mixture of 5000 g of pure water and 250 g of n-butanol was cooled to −5° C., and 300 g of aqueous ammonia (0.28% by weight) was added thereto. Thereafter, the above reaction mixture (A) was added and, after the addition, agitated for 16 hr. Thus, a core particle dispersion was obtained.

The obtained fine particles were separated from the solvent and dried at 200° C., thereby obtaining core particles composed of a polysiloxane which had an average particle size of 3.2 μm. The compressive modulus of the core particles was measured.

The results are given in Table 1.

Preparation of Particles Composed of Laminate Part Constituting Component 100 g of aqueous ammonia (0.28% by weight) was added to a solution consisting of a mixture of 5000 g of pure water and 250 g of n-butanol. While maintaining the temperature at −5° C., 470 g of methyltrimethoxysilane, 30 g of tetramethoxysilane and 5 g of dibutoxybisacetylacetonatozirconium were added thereto at a rate of 0.005 g/pure water·g·hr. After the completion of the addition, the temperature was raised to 60° C., and the mixture was aged for 5 hr. Thus, there was obtained a dispersion of spherical particles composed of a methyltrimethoxysilane/ tetramethoxysilane/dibutoxybisace-tyl-acetonatozirconium hydrolyzate polycondensate. The obtained spherical particles were separated from the solvent, dried and fired in a nitrogen atmosphere at 400° C. Thus, there were obtained spherical particles whose average particle size and CV value were 4.3 μm and 11.5%, respectively. The compressive modulus of obtained particles (namely, corresponding to the compressive modulus of laminate part) was measured. The results are given in Table 1.

Preparation of Spherical Laminated Particles 30 g of the above obtained core particles were dispersed in a solution consisting of a mixture of 5000 g of pure water and 250 g of n-butanol. 100 g of aqueous ammonia (0.28% by weight) was added to the dispersion. While maintaining the temperature at −5° C., a mixture of 470 g of methyltrimethoxysilane, 30 g of tetramethoxysilane and 5 g of dibutoxybisacetylacetonatozirconium was added thereto at a rate of 0.005 g/pure water·g·hr.

After the completion of the addition, the temperature was raised to 60° C., and the mixture was aged for 5 hr. Thus, a polycondensate composed mainly of methyltrimethoxysilane hydrolyzate was laminated onto the core particles.

The solute of the obtained laminated particle dispersion was separated from the solvent, dried and fired in a nitrogen atmosphere at 400° C. Thus, there were obtained spherical laminated particles whose average particle size and CV value were 6.5 μm and 1.9%, respectively.

The compressive modulus, elastic recovery ratio and compressive strength of obtained spherical laminated particles were measured.

The results are given in Table 1.

Example 3

Preparation of Core Particles

An aqueous solution of sodium silicate (SiO$_2$ concentration 3% by weight) was passed through a column of cation exchange resin to thereby dealkalify the same. Thus, 1000 g of a silicic acid solution was obtained. 170 g of vinyltrimethoxysilane was mixed into the silicic acid solution, and 50 g of n-butanol was added thereto. The mixture was cooled to −5° C., and 60 g of aqueous ammonia (0.28% by weight) was added thereto. After the addition, agitation was continued for 6 hr, thereby obtaining a core particle dispersion.

The obtained fine particles were separated from the solvent and dried at 200° C., thereby obtaining core particles which had an average particle size of 4.1 μm. The compressive modulus of the core particles was measured.

The results are given in Table 1.

Preparation of Particles Composed of Laminate Part Constituting Component 100 g of aqueous ammonia (0.28% by weight) was added to a solution consisting of a mixture of 5000 g of pure water and 250 g of n-butanol. While maintaining the temperature at −5° C., 250 g of methyltrimethoxysilane and 250 g of vinyltrimethoxysilane were added thereto at a rate of 0.005 g/pure water·g·hr. After the completion of the addition, the temperature was raised to 60° C., and the mixture was aged for 5 hr. Thus, there was obtained a dispersion of spherical particles composed of a methyl trimethoxysilane/ vinyltrimethoxysilane hydrolyzate polycondensate. The obtained spherical particles were separated from the solvent, dried and fired in a nitrogen atmosphere at 400° C. Thus, there were obtained spherical particles whose average particle size and CV value were 5.7 μm and 9.8%, respectively. The compressive modulus of obtained particles (namely, corresponding to the compressive modulus of laminate part) was measured. The results are given in Table 1.

Preparation of Spherical Laminated Particles 150 g of the above obtained core particles were dispersed in a solution consisting of a mixture of 5000 g of pure water and 250 g of n-butanol. 100 g of aqueous ammonia (0.28% by weight) was added to the dispersion. While maintaining the temperature at −5° C., a mixture of 250 g of methyltrimethoxysilane and 250 g of vinyltrimethoxysilane was added thereto at a rate of 0.005 g/pure water·g·hr. After the completion of the addition, the temperature was raised to 60° C., and the mixture was aged for 5 hr. Thus, a methyltrimethoxysilane/vinyltrimethoxysilane hydrolyzate polycondensate was laminated onto the core particles.

The obtained laminated particles were separated from the solvent, dried and fired in a nitrogen atmosphere at 300° C. Thus, there were obtained spherical laminated particles whose average particle size and CV value were 5.4 μm and 1.2%, respectively.

The compressive modulus, elastic recovery ratio and compressive strength of obtained spherical laminated particles were measured.

The results are given in Table 1.

Example 4

Preparation of Core Particles

A solution consisting of a mixture of 1080 g of pure water and 0.2 g of acetic acid was cooled to 5° C. 1470 g of phenyltrimethoxysilane was added thereto and mixed. The temperature was raised to 60° C., and the mixture was agitated for 15 hr. Thus, reaction mixture (A) was obtained.

A mixture of 5000 g of pure water and 250 g of n-butanol was cooled to −5° C., and 300 g of aqueous ammonia (0.28% by weight) was added thereto. Thereafter, the above reaction mixture (A) was added and, after the addition, agitated for 6 hr. Thus, a core particle dispersion was obtained.

The obtained fine particles were separated from the solvent and dried at 120° C., thereby obtaining core particles which had an average particle size of 2.4 µm. The compressive modulus of the core particles was measured.

The results are given in Table 1.

Preparation of Particles Composed of Laminate Part Constituting Component 100 g of aqueous ammonia (0.28% by weight) was added to a solution consisting of a mixture of 5000 g of pure water and 250 g of n-butanol. While maintaining the temperature at −5° C., 425 g of methyltrimethoxysilane and 110 g of phenyltrimethoxysilane were added thereto at a rate of 0.005 g/pure water·g·hr. After the completion of the addition, the temperature was raised to 60° C., and the mixture was aged for 5 hr. Thus, there was obtained a dispersion of spherical particles composed of a trimethoxysilane/phenyltrimethoxysilane hydrolyzate polycondensate. The obtained spherical particles were separated from the solvent, dried and fired in a nitrogen atmosphere at 400° C. Thus, there were obtained spherical particles whose average particle size and CV value were 6.1 µm and 15.6%, respectively. The compressive modulus of obtained particles (namely, corresponding to the compressive modulus of laminate part) was measured. The results are given in Table 1.

Preparation of Spherical Laminated Particles 50 g of the above obtained core particles were dispersed in a solution consisting of a mixture of 5000 g of pure water and 250 g of n-butanol. 100 g of aqueous ammonia (0.28% by weight) was added to the dispersion. While maintaining the temperature at −5° C., a mixture of 425 g of methyltrimethoxysilane and 110 g of phenyltrimethoxysilane was added thereto at a rate of 0.005 g/pure water·g·hr. After the completion of the addition, the temperature was raised to 60° C., and the mixture was aged for 5 hr. Thus, a methyltrimethoxysilane/phenyltrimethoxysilane hydrolyzate polycondensate was laminated onto the core particles.

The obtained laminated particles were separated from the solvent, dried and fired in a nitrogen atmosphere at 450° C. Thus, there were obtained spherical laminated particles whose average particle size and CV value were 4.2 µm and 1.2%, respectively.

The compressive modulus, elastic recovery ratio and compressive strength of obtained spherical laminated particles were measured.

The results are given in Table 1.

Example 5

Preparation of Core Particles

A mixture (mixture A) of 100 parts by weight of ethyl silicate (SiO₂ 28% by weight) and 500 parts by weight of ethanol and a mixture (mixture B) of 500 parts by weight of ethanol and aqueous ammonia (28% by weight) were prepared.

A mixture of 1000 g of ethanol and 160 g of aqueous ammonia was injected in a reaction vessel equipped with an agitator. While maintaining the temperature at 60° C., the mixture A and mixture B were simultaneously added thereto at respective rates of 6 g/min and 7.5 g/min. When the amount of added ethyl silicate reached 1000 g, the volume of the reaction mixture in the reaction vessel was reduced to 1/10, and the addition of the mixture A and mixture B was continued in similar conditions.

Further, when the amount of added ethyl silicate reached 2000 g, the volume of the reaction mixture was reduced to 1/10, and the addition of the mixture A and mixture B was continued in similar conditions.

When the amount of added ethyl silicate reached 5000 g, the reaction was terminated to thereby obtain a core particle dispersion.

The obtained fine particles were separated from the solvent and dried at 120° C., thereby obtaining core particles which had an average particle size of 5.5 µm. The compressive modulus of the core particles was measured by the above method.

The results are given in Table 1.

Preparation of Particles Composed of Laminate Part Constituting Component 100 g of aqueous ammonia (0.28% by weight) was added to a solution consisting of a mixture of 5000 g of pure water and 250 g of n-butanol. While maintaining the temperature at −5° C., 250 g of methyltrimethoxysilane and 250 g of vinyltrimethoxysilane were added thereto at a rate of 0.005 g/pure water·g·hr. After the completion of the addition, the temperature was raised to 60° C., and the mixture was aged for 5 hr. Thus, there was obtained a dispersion of spherical particles composed of a methyl trimethoxysilane/vinyltrimethoxysilane hydrolyzate polycondensate. The obtained spherical particles were separated from the solvent, dried and fired in a nitrogen atmosphere at 400° C. Thus, there were obtained spherical particles whose average particle size and CV value were 5.7 µm and 9.8%, respectively. The compressive modulus of obtained particles (namely, corresponding to the compressive modulus of laminate part) was measured. The results are given in Table 1.

Preparation of Spherical Laminated Particles 300 g of the above obtained core particles were dispersed in a solution consisting of a mixture of 5000 g of pure water and 250 g of n-butanol. 100 g of aqueous ammonia (0.28% by weight) was added to the dispersion. While maintaining the temperature at −5° C., a mixture of 250 g of methyltrimethoxysilane and 250 g of vinyltrimethoxysilane was added thereto at a rate of 0.005 g/pure water·g·hr. After the completion of the addition, the temperature was raised to 60° C., and the mixture was aged for 5 hr. Thus, a methyltrimethoxysilane/vinyltrimethoxysilane hydrolyzate polycondensate was laminated onto the core particles.

The obtained laminated particles were separated from the solvent, dried and fired in a nitrogen atmosphere at 350° C. Thus, there were obtained spherical laminated particles whose average particle size and CV value were 6.6 µm and 1.5%, respectively.

The compressive modulus, elastic recovery ratio and compressive strength of obtained spherical laminated particles were measured.

The results are given in Table 1.

Comparative Example 1

100 g of aqueous ammonia (0.28% by weight) was added to a solution consisting of a mixture of 5000 g of pure water and 250 g of n-butanol. 500 g of methyltrimethoxysilane was added to the above solution maintained at −5° C. at a rate of 0.005 g/pure water·g·hr. After the completion of the addition, the temperature was raised to 60° C., and the mixture was aged for 5 hr. Thus, there was obtained a dispersion of spherical particles composed of a methyltrimethoxysilane hydrolyzate polycondensate. The obtained spherical particles were separated from the solvent, dried and fired in a nitrogen atmosphere at 400° C. Thus, there were obtained spherical particles whose average particle size and CV value were 5.3 μm and 6.8%, respectively.

The compressive modulus and compressive strength of obtained particles were measured. The results are given in Table 1.

TABLE 1

| | Compressive modulus (kg/mm²) | | | Elastic recovery (%) | Compressive strength (g) |
|---|---|---|---|---|---|
| | core particle | laminate part | spherical laminated particle | | |
| Example 1 | 5000 | 370 | 400 | 85 | 4 |
| Example 2 | 3000 | 520 | 600 | 90 | 5 |
| Example 3 | 2000 | 850 | 1000 | 85 | 6 |
| Example 4 | 800 | 480 | 500 | 80 | 3 |
| Example 5 | 5000 | 850 | 1000 | 95 | 8 |
| Comp. Ex. 1 | — | — | 370*¹ | 75 | 2 |

*¹In Comparative Example 1, the compressive modulus of spherical particles is indicated.

Examples 6 to 10 and Comparative Example 2

Spherical laminated particles obtained in Examples 1 to 5 and spherical particles obtained in Comparative Example 1 were substantially uniformly spread at a spread density of about 100 particles/mm² on the alignment coating of one transparent electrode furnished substrate comprising a glass plate and, disposed on one side thereof, a transparent electrode and an alignment coating. This substrate was fitted to another substrate of the same structure so that the electrode surfaces were arranged opposite to each other, and the substrates were bonded with each other under a pressure of about 0.05 g per particle.

A liquid crystal was placed in an interstice of the substrates and sealed, thereby obtaining a liquid crystal cell.

Ten liquid crystal cells were prepared in the above manner, and the respective cell gaps and dispersions were evaluated. Specifically, the cell gap was measured at five locations of each of the cells by the use of an interference film thickness gauge, and the average cell gap and the dispersion (standard deviation/average value×100) were determined from the measurements.

The results are given in Table 2.

The ten liquid crystal cells were cooled to −40° C. and returned to ordinary temperature, and an observation was made for the presence of any of low-temperature bubbling. No bubbling was observed on all the liquid crystal cells.

Furthermore, image irregularity was evaluated by a visual inspection of liquid crystal display. No irregularity was found.

TABLE 2

| | Cell gap (mm) | Dispersion (%) |
|---|---|---|
| Example 6 | 7.0 | 5 |
| Example 7 | 6.4 | 9 |
| Example 8 | 5.4 | 5 |

TABLE 2-continued

| | Cell gap (mm) | Dispersion (%) |
|---|---|---|
| Example 9 | 4.1 | 5 |
| Example 10 | 6.5 | 7 |
| Comp. Ex. 2 | 5.2 | 30 |

What is claimed is:

1. Spherical laminated particles each comprising a core particle and a laminate part disposed on a surface of the core particle, wherein the laminate part has a compressive modulus which is smaller than that of the core particle, the compressive modulus of the core particles is in the range of 200 to 6000 kg/mm², the compressive modulus of the spherical laminated particles or the compressive modulus of the laminated parts is in the range of 50 to 1000 kg/mm², and the laminate part is composed of a hydrolyzate of one member or a mixture of at least two members selected from among compounds represented by the following formulae (II) to (IV):

$$R^2Si(OR^3)_3 \quad (II)$$

$$R^4R^5Si(OR^6)_2 \quad (III)$$

(IV)

wherein R² represents a substituted or unsubstituted group having 1 to 10 carbon atoms; R³ represents a hydrogen atom or an organic group having 1 to 10 carbon atoms selected from the group consisting of alkyl, alkoxyalkyl and acyl groups; each of R⁴ and R⁵ represents a group having 1 to 10 carbon atoms selected from among substituted or unsubstituted hydrocarbon groups; R⁶ represents a hydrogen atom or an organic group having 1 to 10 carbon atoms selected from among alkyl, alkoxyalkyl and acyl groups; R⁷ represents a propyl group or a butyl group; Y represents an organic group selected from among methyl, methoxy and ethoxy groups, M represents an element selected from among those of the Groups 2 to 15 of the Periodic Table; and m is an integer of 1 to 4 provided that m+n is an integer of 2 to 4.

2. The spherical laminated particles as claimed in claim 1, wherein the core particle is composed of a polysiloxane obtained by hydrolyzing an organosilicon compound represented by the following formula (I) and/or formula (II):

$$Si(OR^1)_4 \quad (I)$$

$$R^2Si(OR^3)_3 \quad (II)$$

wherein each of R¹ and R³ represents a hydrogen atom or an organic group having 1 to 10 carbon atoms selected from the group consisting of alkyl, alkoxyalkyl and acyl groups; and R² represents a substituted or unsubstituted hydrocarbon group having 1 to 10 carbon atoms.

3. The spherical laminated particles as claimed in claim 2, wherein the core particle is composed of a polysiloxane obtained by subjecting a mixture selected from the group consisting of mixture A, mixture B and mixture C to hydrolysis and polymerization wherein:

mixture A is a mixture of an organosilicon compound represented by formula (I) and a silicic acid solution;

mixture B is a mixture of an organisilicon compound represented by formula (II) and a silicic acid solution; and mixture C is a mixture of an organosilicon compound represented by formula (I), an organosilicon compound represented by formula (II) and a silicic acid solution.

4. A liquid crystal display comprising a liquid crystal cell fitted with a pair of electrodes between which the spherical laminated particles claimed in claim 1 are interposed as spacers.

* * * * *

UNITED STATES PATENT AND TRADEMARK OFFICE
CERTIFICATE OF CORRECTION

PATENT NO.    : 6,294,230 B1
DATED         : September 25, 2001
INVENTOR(S)   : Tsuguo Koyanagi et al.

It is certified that error appears in the above-identified patent and that said Letters Patent is hereby corrected as shown below:

Column 2,
Line 67, after "(IV):" delete "r-".

Column 8,
Line 30, "defined a s" should read -- defined as --.

Column 10,
Line 12, "NaCH" should read -- NaOH --.

Signed and Sealed this

Sixteenth Day of April, 2002

Attest:

JAMES E. ROGAN
Attesting Officer        Director of the United States Patent and Trademark Office